Aug. 24, 1965  C. A. BODGE  3,202,786
LOW CAPACITY, LOW CURRENT THERMAL TIME DELAY RELAY
Filed July 29, 1959  5 Sheets-Sheet 1

Inventor,
Clifford A. Bodge,
by Harold Levine
Att'y.

Inventor,
Clifford A. Bodge,
by Harold Levine
Att'y.

Inventor,
Clifford A. Bodge,
by Harold Levine
Att'y.

Aug. 24, 1965     C. A. BODGE     3,202,786
LOW CAPACITY, LOW CURRENT THERMAL TIME DELAY RELAY
Filed July 29, 1959     5 Sheets-Sheet 5

Inventor,
Clifford A. Bodge,
by Harold Levine
Att'y.

United States Patent Office 3,202,786
Patented Aug. 24, 1965

3,202,786
LOW CAPACITY, LOW CURRENT THERMAL TIME DELAY RELAY
Clifford A. Bodge, Attleboro, Mass., assignor to Texas Instruments Incorporated, Dallas, Tex., a corporation of Delaware
Filed July 29, 1959, Ser. No. 830,220
7 Claims. (Cl. 200—113)

This invention relates to thermal protective devices, and more particularly, to low-capacity, low-current rated type thermal time delay relays. The relays of the instant invention are especially suited for, though not limited to, protecting and switching the start or phase windings of split-phase, fractional horsepower, electric motors. The start or phase winding is generally of a fine, relatively high-resistance wire and generally can withstand continuous operation for only a short time. It is therefore important that a protective switching device for a split-phase motor should not permit the start winding to be subjected to currents for a damaging length of time or to those currents which are excessively high. The start winding relay must be effective to de-energize the start winding in the short time specified for the particular motor and make it impossible for the start winding to become re-energized at an improper time.

It is one object of the invention to provide a thermal time delay relay which will accomplish the above objectives.

It is another object to provide a thermal time delay relay which is adapted for miniaturization, is simple and inexpensive to manufacture and yet dependable in the performance of its functions.

It is another object of the instant invention to provide a relay which is especially applicable for protection of the phase or start winding of fractional horsepower motors such as are employed, for example, in refrigeration installations, electrical appliances, e.g. washing machines, electric dryers, etc. and business machines, e.g. electric typewriters, calculators, etc.

A further object is to provide a thermal time delay relay utilizing a thermally responsive means which reliably effects a comparatively low electrical current rating.

It is another object to provide a thermal relay which employs an electrically conducting, thermally responsive or electrothermal element which is self-protecting and is operative to shunt itself out to prevent deleterious overheating thereof.

It is another object of the instant invention to provide a thermal time delay relay which affords a quick reset.

Among the further objects of the instant invention are the provisions of a thermal time delay relay which is durable, accurate, reliable in operation, compact, versatile and susceptible to diverse applications; which embodies a minimum number of parts and which is simple and economical to assemble and manufacture.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of the various possible embodiments of the invention is illustrated:

FIG. 2a is a fragmentary view similar to FIG. 2, illustrating the thermally responsive means and contacts carried thereby, in an intermediate position;

Figure 2:
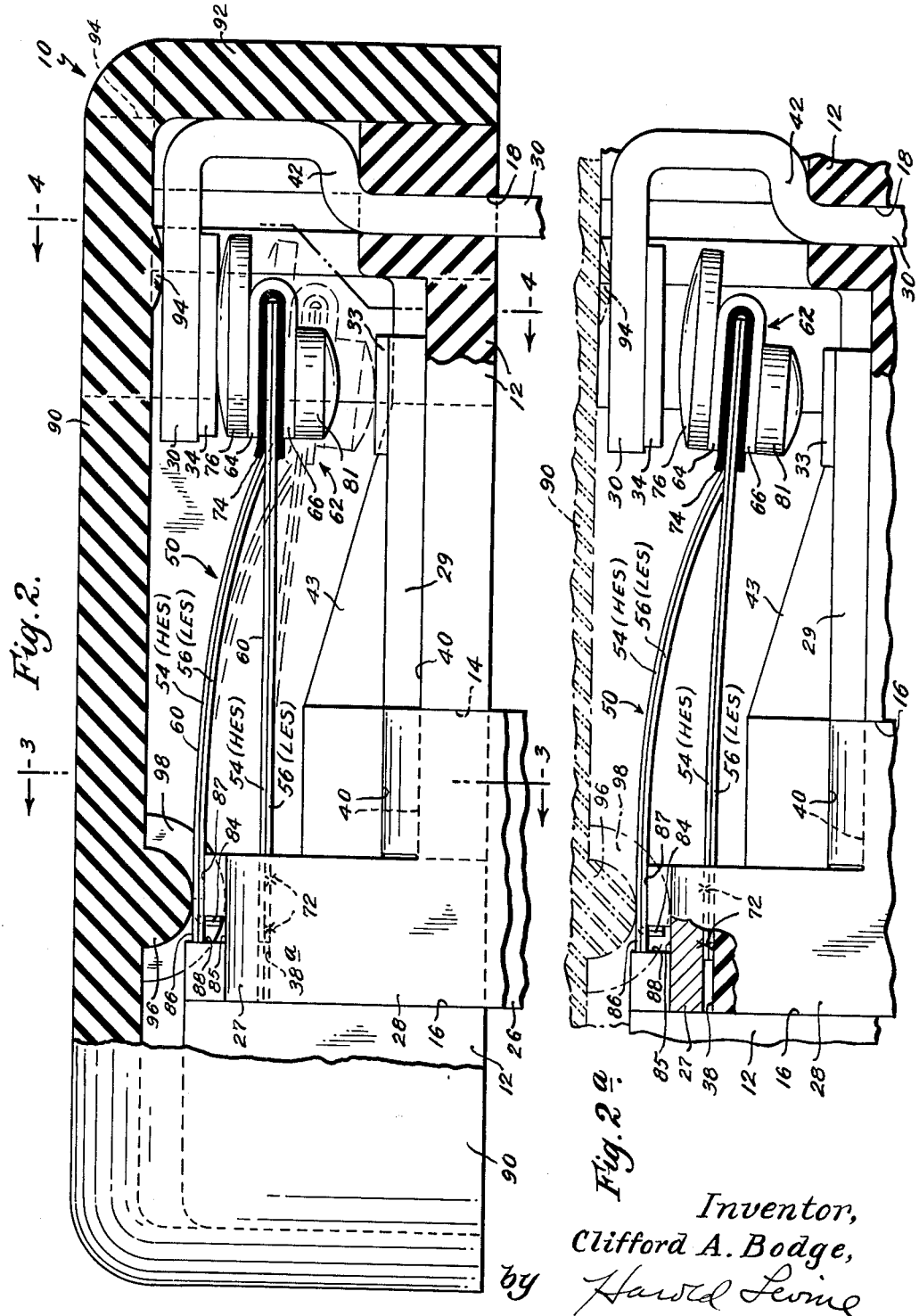
FIG. 2 is an elevational view of the thermal relay, with parts broken away.
Figure 3:
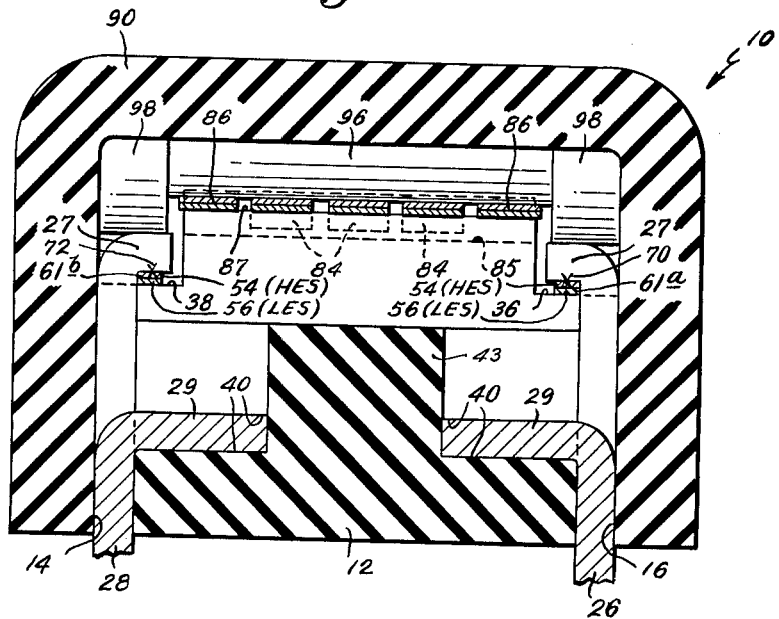
Figure 4:
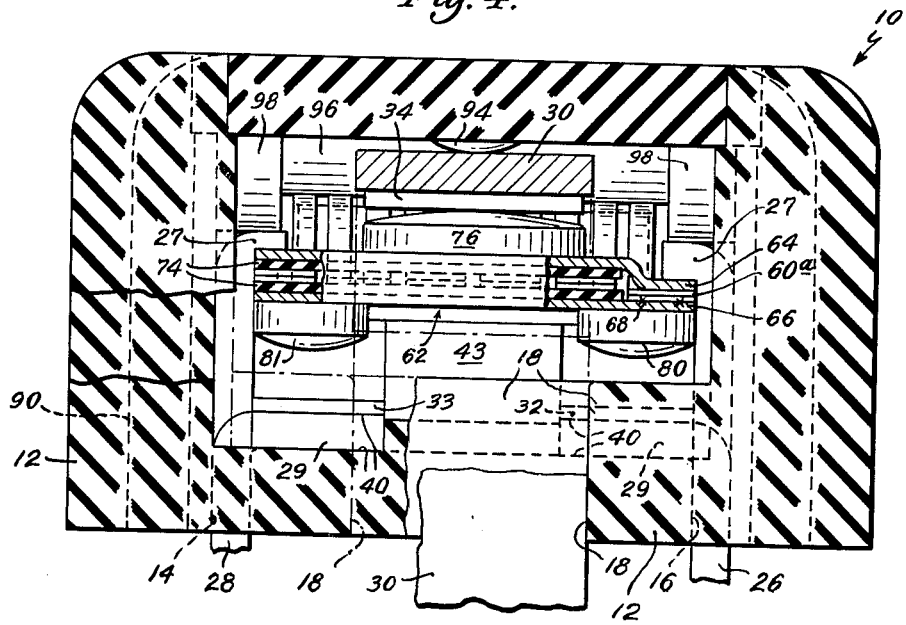
Figure 5:
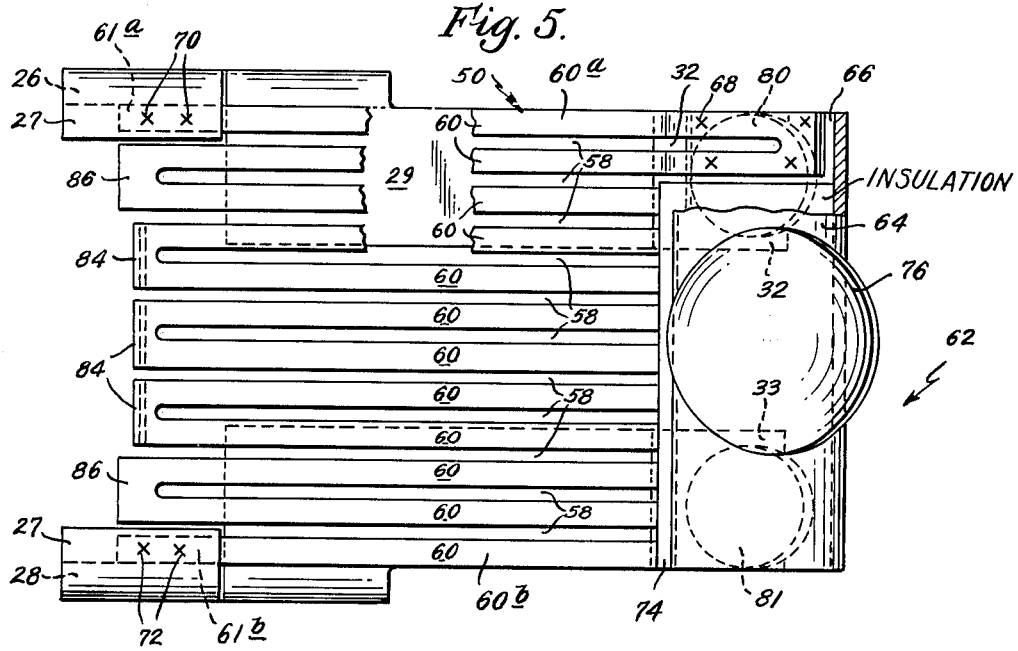
Figure 6:
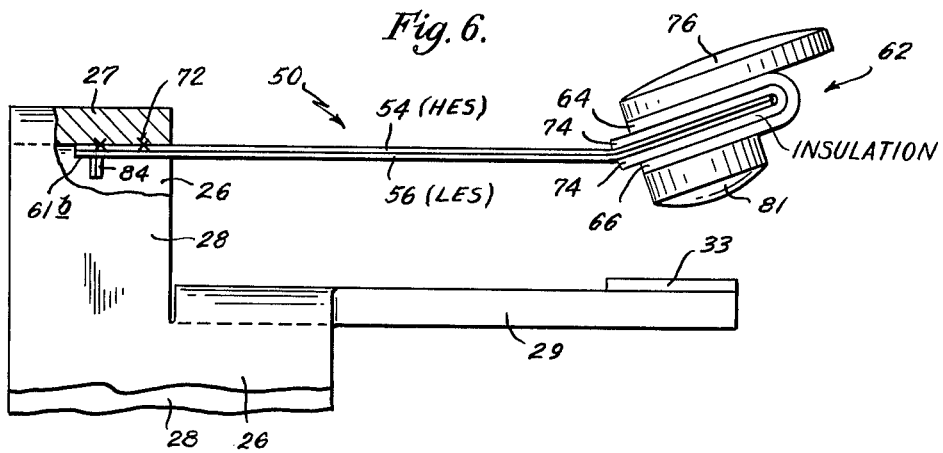
Figure 7:
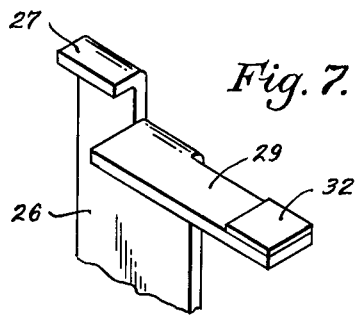
Figure 8:
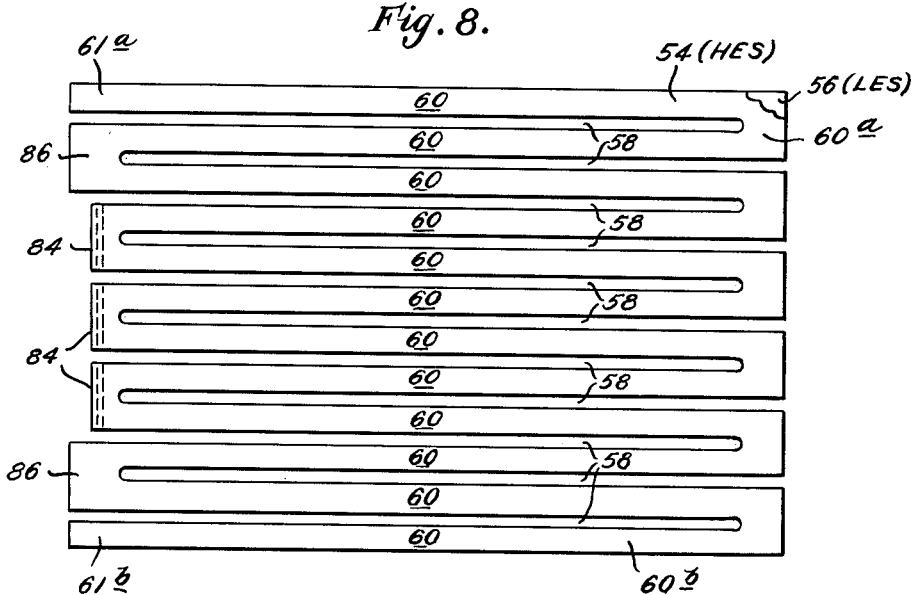
Figure 9:
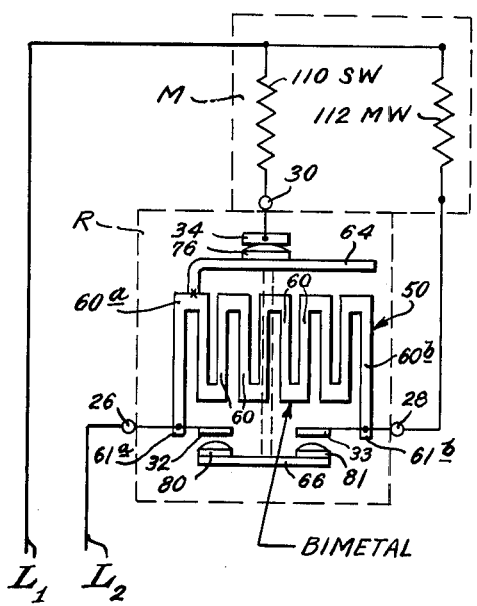
Figure 10:
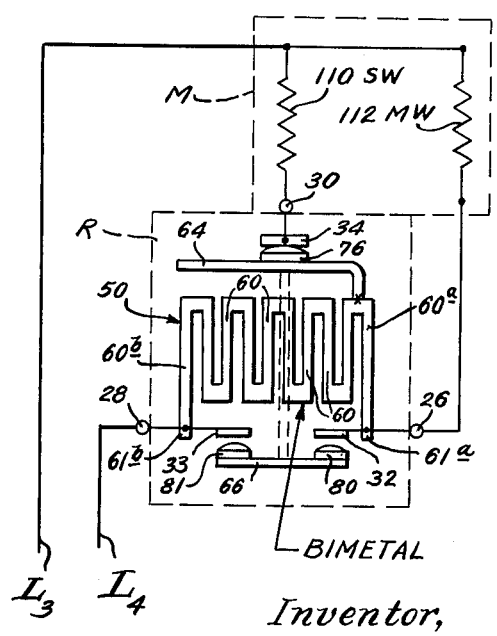

FIG. 3 is a sectional view taken on line 3—3 of FIG. 2;
FIG. 4 is a sectional view taken on line 4—4 of FIG. 2;
FIG. 5 is a top plan view of a subassembly of the thermal relay;
FIG. 6 is a side elevation of the subassembly shown in FIG. 5;
FIG. 7 is a perspective view of a contact-carrying terminal of the relay;
FIG. 8 is a top plan view of a partially formed blank for the thermally responsive means of the relay; and
FIGS. 9 and 10 are schematic wiring diagrams for the relay shown in combination with a split-phase electric motor.

Dimensions of certain of the parts as shown in the drawing have been modified and/or exaggerated for purposes of clarity of illustration.

Similar reference characters indicate corresponding parts throughout the several views of the drawings.

Figure 1:
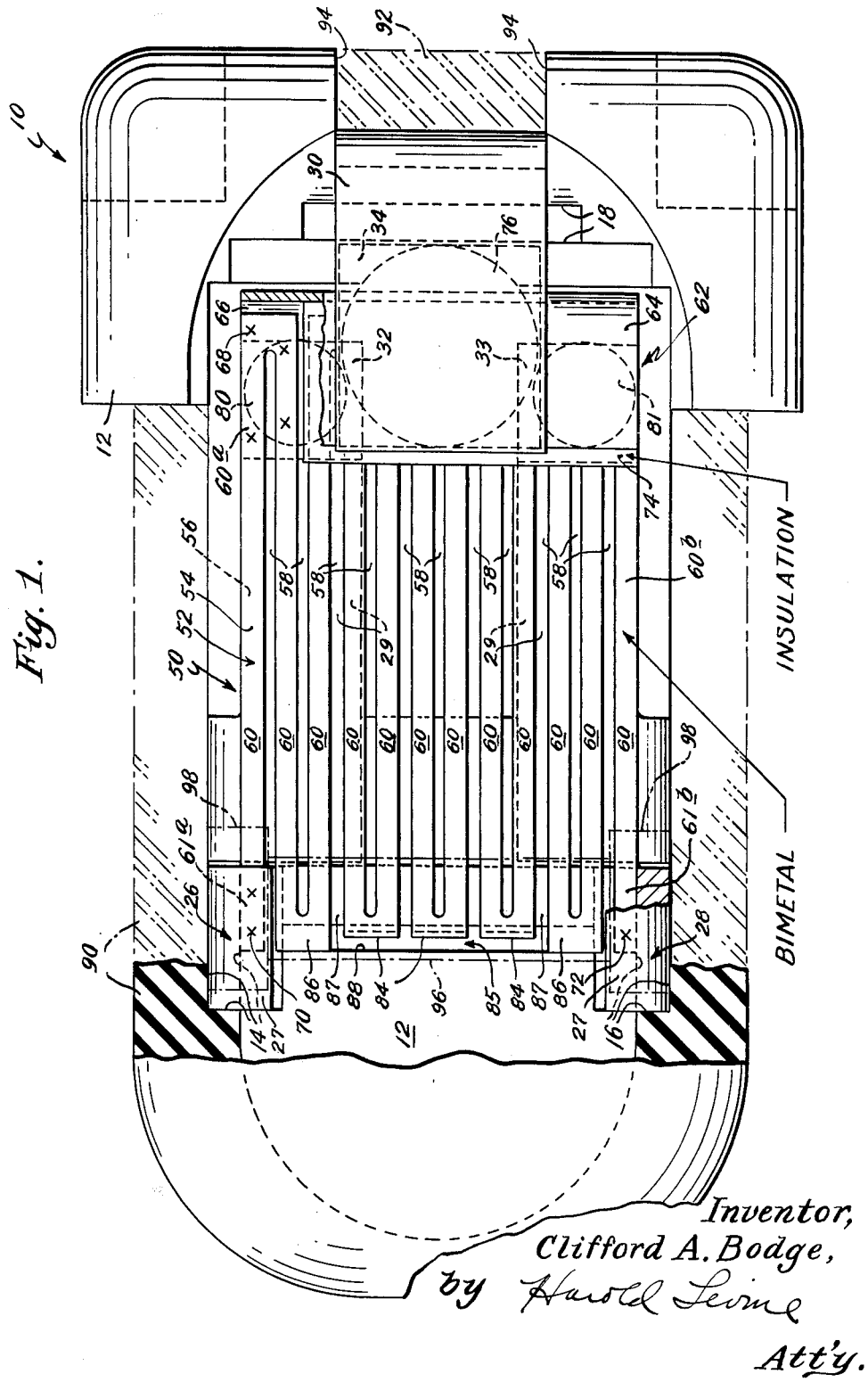
FIG. 1 is a top plan view, with portions of the cover removed, of a thermal relay embodiment of the instant invention.

Referring now to FIGS. 1–4, an electrical switch embodying the instant invention is shown taking the form of a thermal time delay relay generally indicated by the reference numeral 10. Thermal relay 10 includes a base member 12 formed of one of the conventional electrically insulated plastics, such as a moldable, phenolic resinous material. Base member 12 is provided with a plurality of vertically open-ended slots or channel-like recesses 14 and 16 and slot 18 opening exteriorly of the base 12, which respectively and co-operatively interfit with and mount electrically conductive terminals 26, 28 and 30. Terminals 26 and 28 are respectively provided on their upper surfaces with stationary electrical contacts 32 and 33 fixedly mounted and electrically connected thereto, as best seen in FIGS. 1, 2 and 2a. Terminal 30 mounts a stationary or fixed electrical contact 34, which is electrically connected thereto, as shown.

Terminals 26 and 28 are symmetrical with respect to a line passing between them and are substantially identical in all other respects. FIG. 7 illustrates terminal 26 in perspective. Terminal 26 includes an elevated, bent-over portion 27 and an elongated, bent-over portion 29 which mounts contact 32 at one end thereof on its upper side, as shown. It is to be understood that terminal 28 also includes a similar bent-over portion 27 and a bent-over portion 29 which mounts contact 33 at one end and at the upper surface thereof.

As will be described in greater detail below, portions 27 of terminals 26 and 28 and parts connected thereto rest on shoulder portions 36 and 38 provided by base 12, as best seen in FIG. 3.

Base 12 is further provided with a slot 40 which receives a portion of bent-over portion 29 of terminals 26 and 28 and co-operates therewith to position the terminals in proper assembled relation on the base, as best seen in FIGS. 2 and 3. Portion 29 also rests on the upper surface of base 12, as best seen in FIGS. 2 and 2a. Base 12 is further provided with a wedge-shaped upwardly extending projection 43 extending along the longitudinal center line of the base, as best seen in FIGS. 2, 2a, 3 and 4. Bent-over portions 29 of terminals 26 and 28 abut the sides of projection 42 and co-operates therewith to facilitate and ensure proper alignment of terminals 26 and 28 with respect to base 12. Terminal 30 has a bent-over portion 42, as best seen in FIGS. 2 and 2a, which rests on the upper surface of base 12 and serves to limit the extent of insertion of terminal 30 into slot 18 and to position terminal 30 and contact 34 carried thereby in proper assembled relation.

Thermal relay 10 includes an electrically conducting, thermally responsive switch means generally indicated at 50 and comprises a thermally responsive element 52 formed of a section of composite thermostatic material, such as for example, bimetal. The high-expansion component of the composite material, as shown in the embodiment of the drawing, is indicated at 54, and the low-expansion component is indicated at 56, as best seen in FIGS. 2, 2a and 6. Layers 54 and 56 which are, respectively, the high- and low-expansion layers are respectively represented on the drawing by HES and LES. Thermally responsive element 52 is slotted alternately from opposite sides, as at 58, to provide a plurality of transverse lengths 60 which are electrically interconnected in series circuit relation, as best seen in FIG. 8. Thermally responsive member 52 further includes a U-shaped strip or clip generally referred to by numeral 62 which is formed of a high electrical conductivity material and encloses one end of each of lengths 60 of thermally responsive element 52. Uppermost length or strip 60a, as viewed in FIGS. 1 and 5, or the extreme right-hand length or strip 60a, as viewed in FIG. 4, is electrically connected at one end to U-shaped strip 62 as by means of a weld 68 to one or both legs 64 and 66 of U-shaped strip 62. The other end 61a, of strip 60a, is electrically connected to the lower surface of portion 27 of terminal 26 as by weld 70, as best seen in FIG. 3, and rests on shoulder portion 36 of base 12 when in final assembled relation. Lowermost length or strip 60b, as viewed in FIGS. 1 and 5 is electrically connected at one end 61b to the underside of bent portion 27 of terminal 28 as by welding at 72. Portion 61b, which is welded to the underside of bent portion 27 of terminal 28, rests on shoulder portion 38 of base 12 when in final assembled relation, as best seen in FIG. 3. The ends of all of the lengths 60 and 60b, with the exception of length 60a, on the side of the section of the thermally responsive member 52 which carries the U-shaped strip 62, are electrically insulated from adjacent portions of U-shaped strip 62 by means of a layer of electrically insulating material 74, as best shown in FIGS. 1 and 5. Insulating material 74 may be any one of a number of well-known kinds, for example, fish paper, Mylar (the latter being a registered trademark to E. I. du Pont de Nemours & Co. for a polyethylene terephthalate resin), etc. The electrically insulating material 74 is interposed between the legs 64 and 66 of the U-shaped strip 62 and overlaps the ends of the remaining lengths on the right-hand side of the section (as viewed in FIG. 5) and is secured to the ends of the lengths and the U-shaped strip 62. Thus, only the end of the uppermost length 60a (as seen in FIGS. 1 and 5) is in electrically conducting relation with U-shaped strip 62 and the remaining ends of the lengths are all electrically insulated from U-shaped strip 62, for a purpose to be described below.

Electrically connected to the upper surface of leg 64 of U-shaped strip 62 and carried thereby is an electrical contact 76 adapted for movement into and out of engagement with contact 34 in response to movement of bimetal member 50 at predetermined temperature and current conditions.

Leg 66 of U-shaped strip means 62, at its lower surface, has electrically connected thereto and carries contacts 80 and 81 for movement into and out of engagement respectively with contacts 32 and 33, in response to movement of the thermally responsive bimetallic element 50 at predetermined temperature and current conditions.

The central or intermediate lengths of thermally responsive member 504 are provided with bent-over portions at 84 at their ends on the left-hand side of the section 52, opposite the U-shaped strip 62, as best seen in FIGS. 1, 2, 3 and 5. Bent-over portions 84 are received in a transversely extending slot or grooved channel 85 provided by casing member 12, as best seen in FIGS. 1, 2 and 2a.

As best seen in FIGS. 2 and 2a, the central transverse lengths rest on a transversely extending shoulder 87 provided by casing member 12 adjacent slot 85. Ends 86 of the transverse lengths adjacent and on either side of the central transverse lengths with the bent-over portions 84 also rest on shoulder 87 and in addition abut rear wall 88 of slot 85, as best seen in FIGS. 2 and 2a. Ends 86, by abutting wall 88, serve to position thermally responsive member 50 in correct longitudinal alignment. The slotted thermally responsive switch member 50 is held in final assembled position and is restrained from vertical movement relative to base 12 by means provided on a cover member to be described below.

As best seen in FIGS. 2, 2a and 3, bent portions 84 and ends 86 of the central or intermediate transverse lengths of slotted bimetal element 52, when the thermally responsive switch means 50 is in final assembled relation, are maintained on shoulder 87 which is at a higher elevation than ends 61a and 61b of outer lengths 60a and 60b. This difference in elevation serves to prevent contact between ends 86 and the adjacent terminals 26 and 28, which could cause short circuiting.

As best seen in FIG. 6, the end portion of the slotted thermally responsive switch member 50 which carries U-shaped strip 62 is deflected at an angle to the main body of the bimetal member so that when central transverse lengths have their bent portions 84 and end portions 86 in final assembled relation, as described above, legs 64 and 66 of U-shaped strip 62 (which are substantially parallel to each other) and contacts 80, 81 and 76 will lie in planes respectively substantially parallel to a plane passing through contacts 32 and 33 and to the plane of contact 34.

Thermal relay 10 is further provided with a cover member 90 which may be formed of the same material as that of base 12. Cover member 90 has integrally formed therewith a downwardly extending projection 92 which mates and interfits with a corresponding complementary shaped slot 94a provided by base member 12, as best seen in FIGS 1 and 2. The interior periphery of cover member 100 is complementary to and mates with the irregular outer periphery of base member 12, as best seen in FIGS. 1, 3 and 4. Cover member 90 may be secured to base 12 in any known convenient manner such as by bolting, deforming, gluing, etc. (not shown). Cover member 90 includes a dome-like downwardly extending project 94 which is adapted to engage the upper surface of terminal 30 and urge terminal 30 downwardly in slot 18 (as best seen in FIG. 2) until bent portion 42 thereof engages the adjacent upper surface of base 12 so as to maintain terminal 30 in proper assembled position in base 12. Cover member 90 further includes transversely and downwardly extending bosses or projections 96 and 98 which serve to fixedly cantilever mount thermally responsive switch means 50. Transversely extending boss or projection 96 is adapted to engage and bear against the central intermediate transverse lengths of thermally responsive member 50 adjacent bent portions 84 and ends 86 to maintain these lengths firmly against shoulder portion 87 of base 12 and substantially prevent any relative vertical movement therebetween when in final assembled relation. Bosses or projections 98, as best seen in FIGS. 2 and 3, engage and bear against the upper surface of portions 27 of terminals 26 and 28 and serve to maintain portions 27 of terminals 26 and 28 and ends 61a and 61b of the transverse lengths 60a and 60b of bimetal element 52 in engagement with shoulders 36 and 38 of base 12. Bosses 96, 98 and 94, when cover member 90 is secured in final assembled relation to base 12, thus respectively serve to retain bent-over portions 84 and ends 86 of the central intermediate lengths of bimetal element 52 and terminals 26, 28 and 30 in fixed assembled relation in base 12 and serve to maintain the terminals in proper assembled relation within base 12.

In practice, thermally responsive means 50 and terminals 26 and 28 are preassembled as a sub-assemely (such as seen in FIGS. 5 and 6) which is slidably inserted into base 12 with bent portions 84 inserted into slot 85 and ends 86 in engagement with wall 88, and resting on shoulder 87. Thereafter, terminal 30 is inserted into slot 18 and the cover member 90 is mounted on base 12 and secured thereto, whereby the parts will be maintained in fixed, proper assembled relation by projections 94, 96 and 98, as described above.

The thermal relay thus far described is especially suited for, though not limited to, use as a protective thermal type time delay relay for fractional horsepower split-phase electrical motors. In this environment, the thermal time delay relay functions as a start winding control for such motors, which are generally appliance type motors having high density start windings. The thermal time delay relay 10 is effective to de-energize the start winding within the required short period of time specified for the particular motor to prevent the start winding from being subjected to continued current for a damaging length of time or to excessively high currents. Contacts 76 and 34 of thermal time delay relay 10, when the latter is employed as a protective or switching device for the start winding of a split-phase electrical motor such as described above, will constitute a pair of normally closed start winding contacts. In this environment or use, leg 66 of contact-carrying U-shaped clip 62 constitutes a shunting bar and contacts 80, 32 and 81, 33 will constitute respectively two pairs of normally open shunt contacts. As will be described in greater detail below, normally open shunt contacts 80, 32 and 81, 33 are effective to shunt out bimetal element 52 (after the normally closed start contacts 76 and 34 have been opened) to prevent overheating and burn out of the bimetallic element 52 and to maintain the latter at a temperature which is just slightly above its reset temperature.

Referring now to the circuit diagrams of FIGS. 9 and 10, the thermal time delay relay is schematically illustrated in exemplary protective circuits with a split-phase electrical motor having an auxiliary start or phase winding 110 and a main winding 112.

Referring now specifically to FIG. 9, terminal 26 of thermal relay 10 is electrically connected to $L_2$, one side of a power source. Terminal 30 is electrically connected in series with start or phase winding 110 and terminal 28 is electrically connected in series with main winding 112. Normally closed start contacts 76 and 34 are connected in series with start winding 110 through terminal 30. Lengths 60a and 60b and all of the lengths 60 intermediate therebetween are connected in series with main winding 112 through terminal 28. Normally open shunt contacts 80, 32, and 81, 33 when closed and shunt bar 66 are connected in shunt across lengths 60a and 60b and thus across all of the transverse lengths 60 intermediate therebetween. Thus shunt contacts 80, 32 and 81, 33 when closed, and shunt bar 66 are also connected in series with main winding 112 through terminal 28. In this connection, leg 66 of U-shaped strip 62 which carries contacts 80 and 81, serve as a shunting bar. As shown in FIG. 9, the bimetallic slotted element 52 with the exception of length 60a, carries only main winding current irrespective of whether start contacts 34 and 76 are closed or open. When start contacts 34 and 76 are closed, length 60a carries both the start and main winding currents and the remaining lengths carry only main winding current. When start contacts 34 and 76 and shunting contacts 80, 32 and 81, 33 are open, all of the lengths of bimetal element 52 will carry main winding current.

Referring now to FIG. 10, terminal 28 of thermal relay 10 is electrically connected to $L_4$, one side of a power source. Terminal 30 is electrically connected in series with start or phase winding 110 and terminal 26 is electrically connected in series with main winding 112. Normally closed start contacts 76 and 34 are connected in series with start winding 110 through terminal 30. Lengths 60a and 60b and all of the lengths 60 intermediate therebetween, are connected in series with main winding 112 through terminal 26. Normally open shunt contacts 80, 32 and 81, 33 (when closed) and shunt bar 66 are connected in shunt across lengths 60a and 60b and across all of the transverse lengths 60 intermediate therebetween. Thus, shunt contacts 80, 32 and 81, 33 (when closed) and shunt bar 66 are also connected in series with main winding 112 through terminal 26. As shown in the circuit of FIG. 10, the bimetallic slotted element, with the exception of length 60a, will carry both the start and main winding currents when start contacts 76 and 34 are closed and length 60a will carry only the main winding current. When start contacts 34 and 76 are open, and shunting contacts 80, 32 and 81, 33 are open, all of the transverse lengths of the bimetal element 52 will carry main winding current only.

The sequence of operation of the thermal relay 10 in the circuit of FIG. 9 is substantially as follows: when the circuit of FIG. 9 is energized, upon starting the motor, start winding current flows through terminal 26, length 60a to leg 64 of U-shaped strip 62, to contact 76, contact 34 and terminal 30. Main winding current flows from terminal 26, length 60a, serially through successive intermediate lengths 60 to length 60b, to terminal 28. When the start contacts 76 and 34 are closed, bimetal element 52 will be heated by the main winding current flowing therethrough and length 60a will also be heated by the additional start winding current flowing therethrough; and as the motor comes up to speed, the thermally responsive switch means 50 will move U-shaped strip 62 downwardly (as best seen in FIG. 2 and shown in the dashed-line portions) in response to heat generated by the current passing therethrough to cause contacts 76 and 34 to separate and thus to deenergize the start winding within the required very short time.

FIG. 2a illustrates the intermediate position of the thermally responsive switch wherein the start contacts 76 and 34 have been opened and shunting contacts 80, 32 and 81, 33 are open so that the main winding or line current is flowing through the slotted bimetal element 52. As bimetal element 52 continues to heat due to the main winding or line current flowing therethrough, in the condition described above and shown in FIG. 2a, it will continue to move downwardly and urge normally open shunting contacts 80, 32 and 81, 33 into engagement (as viewed in FIG. 2 and shown in the dashed-line portion) to shunt the main winding current out of the bimetal element 52 and route the current in a path through terminal 26, contact 32, contact 80, shunt bar 66, contact 81, contact 33 and terminal 28. The current being thereby shunted out of the bimetal element 52, the latter is protected from overheating and burn out due to excessively high current which might be encountered in overload or locked rotor conditions of the motor, or due to main winding current flow through element 52 for a damaging length of time. After shunt contacts 80, 32 and 81, 33 are closed thereby shunting the main winding current out of the bimetallic element 52, the latter will cool and move upwardly and open the shunting contacts and assume an intermediate position shown in FIG. 2a. Opening the shunting contacts causes the main winding current to again flow through the bimetallic element 52 which results in further heating thereof. This further heating causes the bimetallic element 52 to move in a direction to again close the shunt contacts before the bimetallic element 52 has cooled and moved upwardly sufficiently, as viewed in FIGS. 2 and 2a, to close start contacts 76 and 34. Once having opened the start contacts 34 and 76, bimetal element 52 will maintain the start contacts 34 and 76 in an open condition while current flows through the main winding and will hunt between a position in which the start contacts 34 and 76 and the shunt contacts are open and a position in which the start contacts are open and the shunt contacts are closed. This cyclic action continues as long as the motor is energized. Shunting contacts 80, 32 and 81, 33, in cycling between a contacts-open and contacts-closed position while start contacts 76 and 34 are open, are effective to maintain the thermally responsive element 52 at a lower temperature which is just slightly above the reset temperature of the device, (that is that temperature at which thermally responsive element 52 would cause the closing of start contacts 76 and 34 to re-energize the start winding). The shunting contacts, by co-operating with the thermally responsive element 52 to maintain the latter at this lower temperature, affords a quick reset of the device. The sequence of operation for the thermal relay 10 in the circuit of FIG. 10 is substantially the same as that described above for the circuit of FIG. 9 except that in the circuit of FIG. 10, terminal 28 is on the line side and each of lengths 60b and the successive intermediate lengths 60 carry both start and main winding currents when start contacts 34 and 76 are closed, with length 60a carrying only main winding current, whereas in the circuit of FIG. 9, length 60a carries both the start and main winding current is carried by each of the successive intermediate lengths and length 60b when the start contacts are closed.

Thus, it is seen from the above that the bimetal element 52 in each of the circuits of FIGS. 9 and 10 is effective to de-energize the start winding within the required very short time and is also effective to protect itself from overheating and maintain itself at a temperature just slightly above the reset temperature by cyclically causing the shunting contacts to shunt the main winding current out of the bimetal element 52, as described above.

By virtue of the slotted construction of the thermally responsive element 52, the latter has a total or effective electrical resistance substantially equal to the sum of the resistance of each of the lengths thereof along with a thermally responsive action or force equal to the combined action or force of all of the individual lengths thereof. It will be clear that an advantage of the slotted construction of the thermally responsive element is that a thermally responsive element is provided having a much higher resistance than similar but unslotted thermally responsive element while at the same time the thermostatic action or force exhibited by the slotted element is substantially or nearly that of the similar but unslotted element. It follows that thermally responsive member 50 and a switch incorporating the same, is capable of a very low current rating.

An advantage of the construction whereby insulating means 74 is secured to each of the legs 64 and 66 of U-shaped strip 62 and the ends of the lengths of the thermally responsive element is that the overall structure is greatly rigidified at that side of the element about which the U-shaped strip is disposed and the width of the successive slots 58 and the thicknesses of the lengths 60, 60a and 60b can be successfully kept to a minimum.

From the above, it will be apparent that the thermally responsive elements of different ratings can be provided by varying the number and the width of lengths 60, as well as the composite material of which the latter are formed.

Thermal relay 10 can also be constructed so as to provide a quick reset of the start contacts by calibrating the bimetal element or constructing it of a high electrical resistance material for high operating temperatures so that the bimetal element will cool quickly.

Thermal time delay relay 10 can be employed in a plurality of circuit arrangements, such as for example, the two exemplary circuits shown in FIGS. 9 and 10 wherein lengths 60a of the bimetal element 52 can be connected either on the line side or main winding side (i.e. terminals 28 and 26 can be selectively connected to the line or main winding side). Thermal relay 10 is particularly advantageous for use with small fractional horsepower motors since it is inherently non-position sensitive and may be used in many applications where a motor is to be operated in a number of different positions. This is a distinct advantage over the common type of magnetic relays now predominantly in use which are sensitive to gravitational orientation. Further, the compact size of the thermal relay 10 enables it to conform to the space requirements encountered in many applications, for example, such as in business machines.

The instant invention provides a thermal relay 10 of versatility which is applicable to protect and switch the start or phase windings of motors which have a high start-to-main winding current ratio and also motors which have a relatively low start-to-main winding current ratio. Where the thermal relay is employed with a motor which has a high start-to-main winding ratio and it is desired to have a quick break of start contacts or a short operating time, terminal 28 can be connected to line (see FIG. 10) so that the slotted bimetallic thermally responsive element 52 will carry both the start and main winding current when the start contacts 76 and 34 are closed. From the above, it is also seen that thermal relay 10 can be employed so as to provide varying operating times on the same motor by varying the type of circuit employed.

From the above it is clear that thermal time delay relay 10 provides a miniaturized, reliable, simply constructed, low-cost device with a minimum number of parts, which is reliable in operation and wherein the bimetal element serves the multiple function of effecting de-energization of the start winding and of self-protection from overheating by the current passing therethrough and of maintaining its temperature just slightly above the reset temperature by shunting itself out as described above.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A switching device comprising a pair of normally closed contacts; a pair of normally open contacts; thermally responsive electrically conductive means carrying one of said normally closed contacts for movement away from the other of said normally closed contacts in response to movement of said thermally responsive means in one direction at a first predetermined flow of current therethrough and also mounting one of said normally open contacts for movement into engagement with the other of said normally open contacts in response to further movement of said thermally responsive means in said one direction at another predetermined current flow therethrough, to shunt out said entire thermally responsive means upon mutual engagement of said normally open contacts; said thermally responsive means comprising a section of electrically conductive, composite material slotted alternately from opposite sides thereof to provide a plurality of transverse lengths electrically connected in series circuit relation; electrically conductive means at one side of said section overlapping the ends of said lengths at said one of said sides and mounting said one of said normally closed contacts and said one of said normally open contacts thereon in spaced relationship, said electrically conductive means being electrically connected to a portion of one of said lengths to establish an electrically conductive path serially through the successive lengths of said composite section, through said one of said lengths, through said electrically conductive means to said one of said normally closed contacts mounted thereon; and electrical insulating material secured to and between said electrically conductive means and the ends of the remaining lengths on said one side of said section.

2. The device as recited in claim 1 and wherein said electrically conductive means comprises a U-shaped strip overlapping opposite surfaces of the ends of said lengths on said one side of said section and wherein said electrical insulating material is interposed between said U-shaped strip and the ends of the remaining lengths on said one side of said section and is secured to said lengths and U-shaped strip.

3. A control for an electric motor having main and phase windings, said control including an electrothermal means connectable in series with both the phase winding and main winding, said electrothermal means being operative to de-energize said phase winding when said electrothermal means moves in one direction at pre-determined temperature and current conditions; shunt means connectable in series with said main winding adapted to shunt out said electrothermal means in response to further movement of the latter in said one direction upon being heated to a predetermined amount by the main winding current after said start winding is de-energized, said electrothermal means comprising a section of electrically conductive, composite material slotted alternately from opposite sides thereof to provide a plurality of transverse lengths electrically connected in series circuit relation; electrically conductive means enclosing one of said sides and being electrically connected to a portion of one of said lengths to establish an electrically conductive path from another of said lengths spaced from said one of said lengths serially through the successive lengths of said composite section intermediate said one and other lengths, to said electrically conductive means; and electrical insulating material between the ends of the remaining lengths on said one side of said section and said electrically conducting means.

4. A control device comprising, electrically conducting composite thermally responsive means; three electrical terminals; a pair of normally closed electrical contacts and shunt means including at least a pair of normally open electrical contacts, one of said normally closed contacts being electrically connected to a first one of said terminals, one of said normally open contacts being electrically connected to the third one of said terminals, said thermally responsive means comprising a section of electrically conductive, composite material slotted alternately from opposite sides thereof to provide a plurality of transverse lengths electrically connected in series circuit relation; electrically conductive means at one side of said section overlapping the ends of said lengths at said one of said sides; said electrically conductive means mounting the other of said normally closed contacts on one side thereof for movement into and out of engagement with said one of said normally closed contacts and mounting the other of said normally open contacts on an opposite side thereof for movement into and out of engagement with said one of said normally open contacts, spaced ones of said lengths each electrically connected at portions thereof, spaced from said one side of said section to second and third ones of said terminals, said electrically conductive means being electrically connected to one of said spaced ones of said lengths to establish an electrically conductive path from one of said second and third terminals through the other of said spaced ones of said lengths serially through the successive lengths of said composite section intermediate said spaced ones of said lengths through said one of said spaced ones of said lengths through said electrically conductive means to said one of said normally closed contacts mounted thereon; and electrically insulating material secured to and between the ends of the remaining lengths on said one side of said section and said electrically conductive means, said thermally responsive means being mounted for movement in one direction at a first predetermined current flow therethrough to open said normally closed contacts and for further movement in said one direction at another predetermined current flow therethrough to thereafter close said normally open contacts to thereby shunt out said thermally responsive means.

5. The device as set forth in claim 4 and wherein said electrically conductive means comprises a U-shaped strip overlapping opposite surfaces of the ends of said lengths on said one side of said section and wherein said electrical insulating material is interposed between said U-shaped strip and the ends of the remaining lengths on said one side of said section and is secured to said lengths and U-shaped strip.

6. A switching device comprising a pair of normally closed contacts; a pair of normally open contacts; a thermally responsive electrically conductive member having a free end and mounted adjacent another end thereof for movement of said free end in response to temperature change; said member including a section of composite material having a high expansion component and a low expansion component, said section being slotted alternately from opposite sides to provide a plurality of transverse lengths interconnected in series circuit relation; a U-shaped strip of electrically conductive material at the free end side of said section, said U-shaped strip enclosing the ends of each of said lengths on said free end side of said section; a portion of one of said lengths being electrically connected to said U-shaped strip and a layer of electrical insulating material between said U-shaped strip and the remaining ends of the lengths on said free end side of said section; one of said normally closed contacts being mounted on one side of said U-shaped strip for movement away from the other of said normally closed contacts in response to movement of said thermally responsive member when the latter is heated to a first amount by the flow of current therethrough; one of said normally open contacts being electrically connected to and mounted on another side of said U-shaped strip for movement into engagement with the other of said normally open contacts in response to movement of said thermally responsive member when the latter is heated to a second amount by the current flow therethrough to shunt out said entire thermally responsive member upon mutual engagement of said normally open contacts.

7. The device as set forth in claim 6 and wherein said thermally responsive member comprises a creep-type elongated composite member.

References Cited by the Examiner

UNITED STATES PATENTS

| | | | |
|---|---|---|---|
| 2,105,005 | 1/38 | Pearce | 317—30 |
| 2,117,123 | 5/38 | Werner | 317—40 |
| 2,280,960 | 4/42 | Lee | 200—113 |
| 2,284,383 | 5/42 | Elmer | 200—113 |
| 2,381,557 | 8/45 | Ray | 200—138 |
| 2,417,912 | 3/47 | Clark | 318—221.9 |
| 2,496,135 | 1/50 | Sedwitz | 200—138 |
| 2,805,302 | 9/57 | Reis | 200—138 |
| 2,912,546 | 11/59 | Arey | 200—116 |

FOREIGN PATENTS 1,063,252   4/54   France.

ROBERT K. SCHAEFER, *Acting Primary Examiner.*

SAMUEL BERNSTEIN, BERNARD A. GILHEANY,
*Examiners.*